United States Patent Office 2,769,004
Patented Oct. 30, 1956

---

2,769,004

PROCESS FOR THE PRODUCTION OF CONVERSION PRODUCTS OF CHLOROTRIAZINES

Hans Huemer, Frankfurt am Main, Germany, assignor to Deutsche Gold- und Silber-Scheideanstalt vormals, Roessler, Frankfurt am Main, Germany No Drawing. Application October 12, 1953,
Serial No. 385,697

Claims priority, application Germany October 11, 1952

7 Claims. (Cl. 260—248)

The present invention relates to an improved process for the production of reaction products of chlorotriazines in which the substituents are connected to a carbon atom of the triazine ring by a carbon to carbon bond.

It has already been proposed to react cyanuric chloride with organic compounds such as alcohols, thio compounds, amino compounds and it was found substitution products connected to the triazine ring through a hetero atom such as oxygen, sulfur or nitrogen could be easily obtained by replacement of the chlorine.

It has, however, proved considerably more difficult to produce substituted triazines in which the substituents are connected to the triazine ring by a carbon to carbon bond. For example, it has been found that such substitution products could not be obtained with the aid of $AlCl_3$ as a catalyst (Klason, J. pr. Ch. [2], 35 (1887) 83), so that the relatively expensive Grignard compounds had to be employed for this purpose and even then the yields obtainable have not always been satisfactory.

In accordance with the invention, it has now unexpectedly been found that such triazine substitution products can easily be obtained by carrying out the reaction in the presence of a hydrogen halide, preferably hydrogen chloride, and aluminum chloride as a catalyst. It was furthermore found that the quantity of hydro halide required to effect the desired activation of cyanuric chloride is considerable, for example, 1⅓ mol per mol of cyanuric chloride. It has, for example, been found very expedient if the reaction mixture, at least, at the start of the reaction, is saturated with hydrogen halide. The quantity of aluminum chloride used can vary within wide limits. Good results were obtained with 1 mol preferably 2 to 3 mols of $AlCl_3$ per mol of cyanuric chloride.

The process according to the invention is carried out in the liquid phase and consequently if both reactants are solid at the reaction temperature employed a solvent must be employed.

The reactants according to the invention are a chlorotriazine on one hand and aromatic hydrocarbons or substituted aromatic hydrocarbons carrying at least one labile hydrogen atom directly attached to the aromatic nucleus on the other hand. For example, the chlorotriazine, preferably cyanuric chloride is reacted with an aromatic hydrocarbon such as benzol in the presence of $AlCl_3$ and hydrogen chloride to give good yields of triphenyl triazine. Preferably the reaction is carried out with an excess of benzol which acts at the same time as a solvent for the cyanuric chloride as well as for the complex formed from cyanuric chloride, hydrogen chloride and aluminum chloride. The reaction can also be carried out with various substituted aromatic compounds in which the substituents may consist of alkyl groups, halogen, dimethyl amino groups and similar groups which in general do not contain a labile hydrogen atom. Strongly acidic groups such as nitro groups are not suited as substituents.

The reaction between cyanuric chloride with benzol or alkylated aromatics can under some circumstances be very vigorous. This, for example, is the case when cyanuric chloride, aluminum chloride (in a quantity of 2 to 3 mols per mol of cyanuric chloride) are mixed with the aromatic hydrocarbon at room temperature and introducing hydrogen chloride into such mixture while cooling with tap water. A considerable quantity of hydrogen chloride is absorbed in the reaction mixture and the temperature thereof rises only slightly at the beginning. However, when saturation with hydrogen chloride has been reached the temperature rises within a few seconds to the boiling point. The progress of the reaction can be tempered by heating the reaction mixture to boiling before introduction of the hydrogen chloride and only passing a moderate stream of hydrogen chloride into the reaction mixture. Even so, when the saturation point with hydrogen chloride is reached a relatively rapid release of heat of reaction must be contended with.

The reaction can be better controlled by gradual addition of $AlCl_3$ or cyanuric chloride with simultaneous super saturation with hydrogen chloride. As the $AlCl_3$ is not soluble in the aromatic or substituted aromatics it is added in solid form. The addition can be made at low temperature (room temperature) as well as at the boiling point of the aromatic reaction component. The addition at the lower temperature is preferred as no difficulties are encountered because of vaporization of the aromatic compounds during the addition of the $AlCl_3$. The gradual addition of the cyanuric chloride has the advantage that cyanuric chloride is soluble in the aromatic component and can be added dropwise in the form of a solution in the aromatic component. In the event, however, that the cyanuric chloride is only sparingly soluble in the aromatic component this can lead to the necessity of using increased quantities of the aromatic component. After completion of the addition of the aluminum chloride or cyanuric chloride, the reaction is completed at an elevated temperature.

The following examples will serve to illustrate the process according to the invention:

*Example 1*

450 grams of cyanuric chloride and 1800 cubic centimeters of benzol were introduced into a three-necked 4 liter flask provided with a gas inlet tube, a thermometer and a stirrer, and a reflux condenser. The mixture was cooled in a water bath at 15 to 16° C. and hydrogen chloride was introduced until the mixture was saturated and during about 2½ hours 750 grams of water-free $AlCl_3$ were added in small portions while a quantity of hydrogen chloride was continuously introduced which was slightly above that which was taken up by the reaction mixture. The temperature within the flask did not rise above 24° C. while the water bath temperature was maintained at 15–16° C. After all of the $AlCl_3$ had been added the mixture was stirred at room temperature for about 2 hours and then heated for 2 hours at the boiling point. The completion of the reaction could be recognized by a relatively sudden solidification of the reaction mixture.

The HCl gas only had to be introduced from an external source until about one half of the $AlCl_3$ had been introduced (about 114 g. HCl gas). From this point on, HCl was set free by the reaction mixture. The amount of HCl thus set free until the end of the reaction was 172 g.

The solid mass obtained as the reaction product appeared rather homogeneous and was easily broken up into a moist powder with a spatula. The reaction product was boiled up six times with about ¾ to 1 liter of 10% HCl and suction filtered hot, and then freed of HCl by boiling up with water three or four times and suction filtering. The boiling with HCl and water also effected complete removal of the excess benzol. The product was then dried overnight in a drying cabinet at 130° to 140° C. The triphenyl triazine product was light cream color and had a melting point of 230–231° C. The yield was 712 g. or 94.5% of the theoretical. This crude product was already very pure as was ascertained by an elemental analysis. By recrystallization from 15½ times the quantity of xylol with the addition of a little active carbon and boiling for five minutes, the triphenyl triazine was recovered in snow white, shining needle shaped crystals having a melting point of 232–233° C.

*Example 2*

125 grams of water-free AlCl₃ and 250 cubic centimeters of benzol were introduced into a three-necked 2 liter flask provided with a gas inlet tube, a thermometer, a stirrer and reflux condenser. The flask was then heated in an oil bath of 80° C. and the contents saturated with hydrogen chloride. Thereafter a solution of 75 grams of cyanuric chloride in 600 cubic centimeters of benzol was added dropwise over a period of two hours under vigorous stirring and introduction of hydrogen chloride gas slightly in excess of that taken up by the reaction mixture. After all of the cyanuric chloride solution had been added the reaction mixture was stirred for a further 2 hours at the same temperature. The reaction product consisted of two supernatant liquid layers, the upper being a thinly liquid, light red brown layer (610 cc.) and the lower being a viscous dark layer. The upper layer essentially consisted of benzol and only a slight residue remained after evaporation of the benzol. The lower layer consisted of a complex of triphenyl triazine, AlCl₃ and HCl which contained a dissolved excess of benzol. This layer was worked up by decomposition of the complex with aqueous HCl in the manner set forth in Example 1. The yield was 116.2 grams of triphenyl triazine (93.8% of the theoretical) of yellow to light brown color. The melting point was 228 to 231° C.

*Example 3*

150 grams of cyanuric chloride, 350 grams of water-free AlCl₃ and 1000 cubic centimeters of chloro-benzol, were introduced into a three-necked 2 liter flask as in Example 2 and the mixture was then saturated with HCl gas while the flask was cooled in a water bath of a temperature of 18–22° C. The temperature of the contents of the flask rose to 30° C. during such saturation with HCl. The contents of the flask were then heated in an hour to 90° C. and then heated to 115 to 120° C. in a further hour, and stirred vigorously, for four hours at such temperature. The reaction product, which was a seemingly homogeneous dark brown solution, was still thinly liquid at 90 to 100° C. This liquid was poured into 2½ liters of water of a temperature of 50° C. while stirring whereby the water heated to 90° C. A rather soft light mass separated out and the water was poured off. In order to remove the excess of chloro-benzol contained in the residue, it was kneaded several times with ½ to 1 liter of petroleum ether. Besides the chloro-benzol, the by-products of the reaction, namely, the partial substitution products of cyanuric chloride with chloro-benzol, were dissolved out by the petroleum ether. The residue which had become powdery was washed out several times with 2½ liters of water to which 50 cubic centimeters of concentrated hydrochloric acid had been added and then washed acid free with water.

The crude product obtained, primarily melted at 285 to 286° C., but contained a residue which did not melt until 312° C. were reached. The crude product consisted of tri-(chlorophenyl)-triazine (a mixture of the ortho- and para-chlorophenyl isomers) and a small quantity of the partial substitution products of cyanuric chloride with chlorobenzol. The yield was 265 grams (78% of the theoretical).

In order to isolate the isomers, 100 grams of the crude product were boiled under stirring with 500 cubic centimeters of tetrahydrofurane, suction filtered hot, and washed six times with 75 cubic centimeters of tetrahydrofurane. The residue was dried at 120° C. and consisted of 58.5 grams of p-trichlorophenyl-triazine with a melting point of 321–324° C. The product was white with a yellow cast. An elemental analysis agreed with the formula of p-trichlorophenyl-triazine. Upon cooling the filtrate a precipitate crystallized out, which was suction filtered and washed with tetrahydrofurane and dried at 120° C., to obtain 10 grams of o-trichlorophenyl-triazine having a melting point of 201–202° C. It also was white with a yellow cast. The tetrahydrofurane was then boiled off of the filtrate and the residue was boiled with 500 cubic centimeters of methanol, and suction filtered hot, the residue washed four times with 30 cubic centimeters of methanol and dried at 120° C. The yield was a further 26.2 grams of o-trichlorophenyl-triazine, also, colored white with a yellow cast and having a melting point of 201–202° C. A sample of the product was recrystallized from benzol, but the melting point was substantially unchanged, namely 201.5–202° C. An elemental analysis gave values agreeing with the formula of o-trichlorophenyl-triazine.

Even though the quantity of benzol employed in Example 1 was not sufficient to dissolve the cyanuric chloride and AlCl₃ is only sparingly soluble in benzol, all of the components dissolved even at room temperature shortly after the introduction of the AlCl₃ was begun. This solution remained thinly liquid and mobile almost until the end of the reaction. Only just before the end of the reaction, the whole reaction mixture solidifies suddenly to a single solid mass. In Example 2, to the contrary, no solidification occurs and two layers are obtained which are liquid when hot.

In order to initiate the reaction according to the invention, the presence of a relatively large quantity of HCl is necessary, for instance, in Example 1 about 1.3 mols of HCl were added per mol of cyanuric chloride. After about ½ of the AlCl₃ are introduced, HCl is split off by the reaction itself and, for example, in Example 1, 2 mols of HCl became available per mol of cyanuric chloride by the time the reaction had ended. The remainder of the HCl is partly bound in the complex produced and partly dissolved therein. The HCl also affects the purity of the product obtained. It is of advantage to maintain an excess of HCl at all times during the entire course of the reaction. If this is not the case at times, for example, when the stream of HCl introduced is not sufficient to convert the AlCl₃ as it is introduced immediately into the complex, H (AlCl₄), so that free AlCl₃ is present, it can lead to the production of a pink to strongly brown triphenyltriazine product.

The reactions, according to the invention, all require relatively larger quantities of AlCl₃ with reference to the cyanuric chloride. For example, in reacting benzol with cyanuric chloride, it was found that 2.3 mols of AlCl₃ per mol of cyanuric chloride were optimal with reference to yield and purity of the reaction product. Upon increase of the quantity of AlCl₃ over this quantity, further increases in yield are not obtained, but upon decrease of the quantity the yield is decreased and larger quantities of mono and disubstituted products are obtained in addition to the trisubstituted product. It is possible in this way to guide the process with reference to the desired end product.

Alkyl derivatives of benzol react as easily as benzol itself, but with derivatives with longer alkyl groups an isomerization of the alkyl groups during the reaction must be reckoned with. With other substituted aromatics such as, for example, chloro-benzol as in Example 3, the reaction is not as vigorous so that all components can be added at one time without fearing a rapid rise in temperature when the HCl is introduced.

The reaction also can be carried out with dimethyl aniline, but because of its basic character, its addition to the reaction mixture is accompanied by a strong release of heat so that it should be added very slowly under cooling with ice.

Besides cyanuric chloride, it is, of course, possible to employ other chlorotriazines which, for example, may carry besides 1 or 2 chlorine groups, 2 or 1 other substituents, such as, for example, alkyl, alkoxy or dimethyl amino substituents.

The reaction products obtained according to the invention can be utilized for many different purposes, for example, as intermediates for substantive dyestuffs and the like.

I claim:

1. A method of initiating and promoting a reaction between cyanuric chloride and a carbocyclic aromatic mononuclear compound of the benzene series carrying at least one labile hydrogen atom on the aromatic nucleus selected from the group consisting of benzol alkyl substituted benzols, halogen substituted benzols and amino substituted benzols in a liquid phase reaction mixture devoid of any polynuclear aromatic compound and essentially composed of such cyanuric chloride, said aromatic mononuclear compound and aluminum chloride which comprises incorporating a hydrohalide in such reaction mixture from an external source.

2. A process according to claim 1 in which the reaction mixture is saturated with hydrogen chloride from an external source and is maintained saturated with hydrogen chloride during the entire course of reaction.

3. A process according to claim 1, in which the cyanuric chloride is gradually added to the reaction mixture.

4. A process according to claim 1, in which the aluminum chloride is gradually added to the reaction mixture.

5. A process according to claim 1, in which the proportion of aluminum chloride to cyanuric chloride is between 1 to 3 mols of aluminum chloride to 1 mol of cyanuric chloride.

6. A method of initiating and promoting a reaction between cyanuric chloride and a carbocyclic aromatic mononuclear compound of the benzene series carrying at least one labile hydrogen atom on the aromatic nucleus selected from the group consisting of benzol alkyl substituted benzols, halogen substituted benzols and amino substituted benzols in a liquid phase reaction mixture devoid of any polynuclear aromatic compound and essentially composed of such cyanuric chloride, said aromatic mononuclear compound and aluminum chloride which comprises incorporating hydrogen chloride in such reaction mixture from an external source.

7. A method of initiating and promoting a reaction between cyanuric chloride and benzol in a liquid phase reaction mixture devoid of a polynuclear aromatic compound and essentially composed of benzol cyanuric chloride and aluminum chloride which comprises saturating such reaction mixture with hydrogen chloride from an external source and maintaining such reaction mixture saturated with hydrogen chloride during the entire course of the reaction.

References Cited in the file of this patent

UNITED STATES PATENTS

| | | |
|---|---|---|
| 1,551,095 | Fritzsche | Aug. 25, 1925 |
| 1,566,742 | Fritzsche | Dec. 22, 1925 |
| 2,232,871 | Schmidt | Feb. 25, 1941 |
| 2,416,656 | Thurston | Feb. 25, 1947 |